US005631513A

United States Patent [19]
Coles et al.

[11] Patent Number: 5,631,513
[45] Date of Patent: May 20, 1997

[54] DYNAMOELECTRIC BRUSH HOLDER CLIP AND CONNECTOR

[75] Inventors: Michael Coles; Robert A. Ciccarelli, Jr., both of Kent; Nick Vona, Jr., Uniontown, all of Ohio

[73] Assignee: Ametek, Inc., Kent, Ohio

[21] Appl. No.: 364,825

[22] Filed: Mar. 20, 1995

[51] Int. Cl.$^6$ .................. H02K 13/00; H02K 11/00
[52] U.S. Cl. .................. 310/239; 310/242; 310/71; 310/89
[58] Field of Search .................. 310/239, 242, 310/247, 71, 89

[56] References Cited

U.S. PATENT DOCUMENTS

| | | | |
|---|---|---|---|
| 3,176,177 | 3/1965 | Huston | 310/239 |
| 3,177,388 | 4/1965 | Cook | 310/239 |
| 3,525,891 | 8/1970 | Lukawitch et al. | 310/239 |
| 3,579,007 | 5/1971 | Walter | 310/242 |
| 4,110,651 | 8/1978 | Fagan | 310/239 |
| 4,413,200 | 11/1983 | Fenicle | 310/239 |
| 4,698,534 | 10/1987 | Smith et al. | 310/89 |

*Primary Examiner*—Steven L. Stephan
*Assistant Examiner*—Michael Wallace, Jr.
*Attorney, Agent, or Firm*—Renner, Kenner, Greive, Bobak, Taylor & Weber

[57] ABSTRACT

A brush holder clip and connector for motors and generators is provided in the form of an integral V-shaped spring steel member having an electrical connector extending from one of the legs thereof and opposite an apex of the clip and connector. The housing containing the commutator has a slot therein through which the brush holder passes. The V-shaped clip and connector is inserted into the slot and wedged between the brush holder and an edge of the slot. The clip and connector is electrically conductive and communicative with the brush holder 22 and is adapted for mating interconnection with a wire or other conductor.

15 Claims, 1 Drawing Sheet

DYNAMOELECTRIC BRUSH HOLDER CLIP AND CONNECTOR

TECHNICAL FIELD

The invention herein resides in the art of dynamoelectric machines such as motors and generators, with reference herein to either also including a reference to the other. Particularly, the invention relates to brush holder assemblies for dynamoelectric machines and, more specifically, to a combination clip and electrical connector for retaining a brush holder assembly in a dynamoelectric machine.

BACKGROUND ART

Electric motors and generators are in common extensive use. Typically, such dynamoelectric machines employ a commutator engaged by a pair of diametrically opposed brushes. The brushes are typically received in a holder fixed with respect to the motor or generator housing. Commonly, the brushes are spring biased, urged against the commutator by a spring force.

In the prior art, brush assemblies have typically been secured by clips, clamps, or the like to the interior of the motor or generator housing. The methods and techniques for fixing the brush assemblies to the housing have often been unnecessarily complex and difficult to implement. Specifically, it has routinely been necessary to access the interior of the housing to effectuate the secured engagement of the brush assembly with the housing.

Additionally, commutator brushes constitute wear parts and require periodic replacement. In the past, removal and replacement of the commutator brush assemblies has required access to the interior of the housing of the motor or generator. Such access has often required the removal of covers, the disassembly of housings, and the removal of the motor itself or portions thereof. Such an operation is not only time consuming, but is a task requiring a reasonable degree of mechanical aptitude and dexterity.

In the prior art, brush holders have typically been formed of brass or other electrically conductive material having a portion thereof formed as an electrical connector or adapted to receive an electrical connector. Electrical communication with the commutator has thus been achieved through he brush holder. However, the formation of an electrical connector as a portion of the brush holder adds to the complexity and cost of the holder. Additionally, means for effectuating such electrical connection directly to the brush holder have often added unnecessarily to the motor assembly time.

There is a need in the art for a means for quickly and reliably effecting secured engagement of a brush holder assembly with respect to the housing of a motor or generator and which can be made without disassembly of the unit. Additionally, there is a need in the art for an assembly allowing the replacement of commutator brushes external to the housing retaining the commutator. There is an additional need in the art for a brush holder securing device which includes an electrical interconnection and effectuates such electrical interconnection when the secured engagement is made.

DISCLOSURE OF INVENTION

In light of the foregoing, it is a first aspect of the invention to provide a dynamoelectric brush holder clip and a connector which may be engaged and disengaged with respect to the brush holder without disassembly of the associated motor or generator.

Another aspect of the invention is the provision of a dynamoelectric brush holder clip and connector which may be engaged and disengaged external to the commutator housing.

A further aspect of the invention is the provision of a dynamoelectric brush holder clip and connector which makes electrical interconnection with the brush holder.

Yet a further aspect of the invention is the provision of a dynamoelectric brush holder clip and connector which includes an electrical connector as an integral portion thereof.

An additional aspect of the invention is the provision of a dynamoelectric brush holder clip and connector which may be easily engaged and disengaged.

Still another aspect of the invention is the provision of a dynamoelectric brush holder clip and connector which may be easily and economically constructed, and which is simple, reliable, and durable in use.

The foregoing and other aspects of the invention which will become apparent as the detailed description proceeds are achieved by apparatus for implementation in a dynamoelectric machine, comprising: a housing; a commutator received within said housing; a brush assembly passing through an opening in said housing; and a clip interposed between said brush assembly and said housing, said clip positionally securing said brush assembly with respect to said housing.

Other aspects of the invention which will become apparent herein are attained by a commutating apparatus, comprising: a housing receiving a commutator therein and having an opening passing through a wall thereof; a brush assembly passing through said opening; and a spring biased clip received within said opening and compressively interposed between said wall and said brush assembly.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
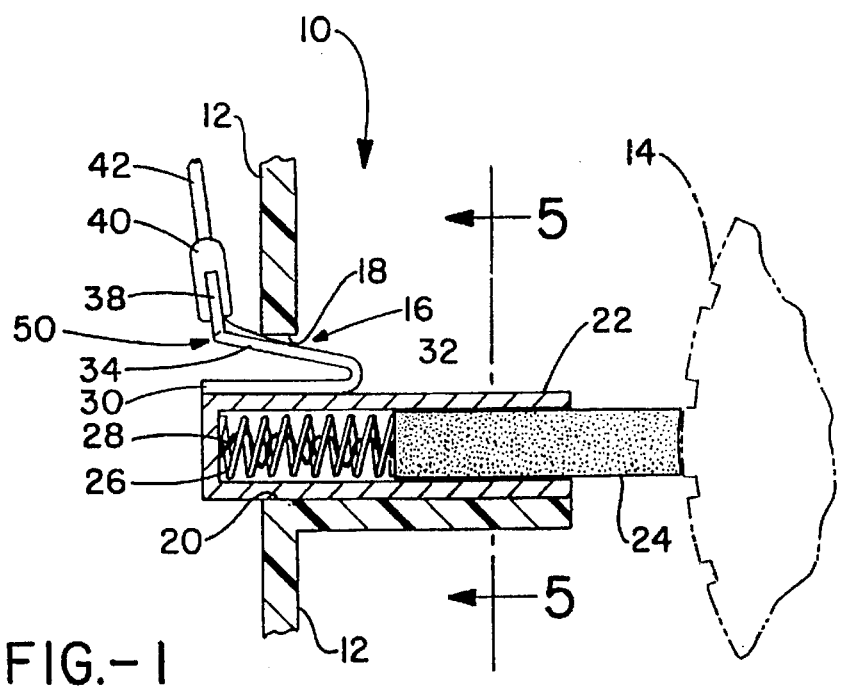
FIG. 1 is a partial sectional view of a brush and commutator assembly according to the invention.

Referring now to the drawings and more particularly FIG. 1, it can be seen that a brush and commutator assembly for implementation in a dynamoelectric machine is designated generally by the numeral 10. For purposes of discussion herein, it will be assumed that the brush and commutator assembly 10 is employed in an electric motor, although a generator or other suitable device could be the subject of discussion as well. As illustrated, a motor housing 12, typically of molded plastic or other electrically insulative material, provides a cavity receiving the motor therein. As shown in FIG. 1, a commutator 14, interconnected to the motor shaft, would be received within the cavity.

As a portion of the invention, the sidewall of the housing 12 is provided with a slot 16 having a top edge 18 and a bottom edge 20, as shown. A brush holder 22 passes through the slot 16 within the housing 12 and is received upon a brush holder guide 44 as shown in cross section in FIG. 5. In the preferred embodiment of the invention, and as is well known to those skilled in the art, the brush holder 22 typically comprises an elongated container which may be formed of an electrically conductive material such as brass.

The container of the brush holder 22 is typically closed at one end and open at the opposite, and receives a commutator brush 24 therein. The brush 24, typically of carbon or a carbon composite, is urged outwardly of the open end of the brush holder 22 by means of a spring 26 which is interposed between the closed end of the brush holder 22 and an end of the brush 24. In standard fashion, a pigtail wire 28 is interconnected between the brush 24 and the closed end of the brush holder 22 to provide for electrical interconnection and to limit the extension of the brush 24 from the open end of the brush holder 22. When the brush 24 has worn to its maximum degree, the spring 26 will have extended to the point that further extension is precluded by the pigtail wire 28 limiting any further movement of the brush 24.

Figure 2:
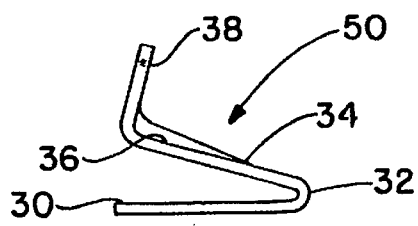
FIG. 2 is a side elevational view of the brush holder clip and connector of the invention.
Figure 3:
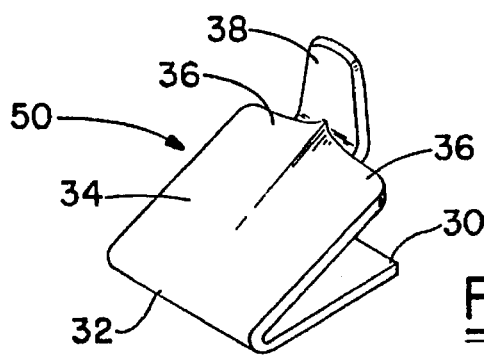
FIG. 3 is a perspective view of the brush holder dip and connector of the invention.
Figure 4:
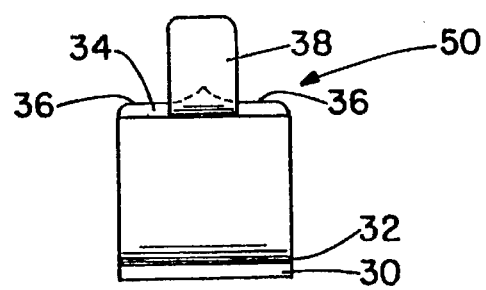
FIG. 4 is a rear elevational view of the brush holder clip and connector of the invention.
Figure 5:
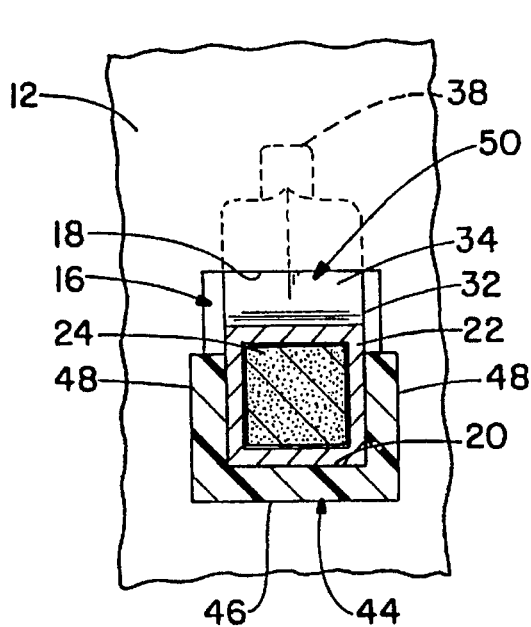
FIG. 5 is cross sectional view of a brush holder retained in a brush holder guide by means of the clip of the invention.

As shown in FIGS. 2–4, a brush holder clip and connector 50 is received within the slot 16 to securedly engage the brush holder 22 within the brush holder guide 44. The brush holder clip and connector 50 is an integral piece, preferably formed of spring steel, and is electrically conductive in nature. The clip and connector 50 includes a base plate 30 adapted to extend across the brush holder and along the length of the base plate 30 as shown in FIGS. 1 and 5. The base plate 30 extends to a bend 32 where the brush holder clip and connector 50 returns upon itself to define an overriding and angled deflectable lip 34. It will be appreciated that the base plate 30 and the deflectable lip 34 define a leaf spring, with the deflectable lip 34 being adapted to engage the top edge 18 of the slot 16. Shoulders 36 are angled upwardly from the deflectable lip 34 and provide a means for engagement by a tool for removal or insertion of the brush holder clip and connector 50 when desired. It will be appreciated that a screwdriver blade may be readily inserted between the shoulders 36 and the housing 20 to facilitate prying removal or disengagement of the clip 50 from the securing interengagement shown in FIG. 1.

According to the preferred embodiment of the invention, an electrical connector 38 extends upwardly from the shoulders 36. While the electrical connector 38 may be of any suitable type, a preferred embodiment of the invention suggests that a spade connector may be so defined. As illustrated in FIG. 1, a mating connector 40 is received upon the spade connector 38 in standard fashion. An appropriate wire or other conductor 42 extends from the mating connector 40.

As shown in FIG. 5, the brush holder guide 44 which is formed as a portion of the housing 12 includes a bottom support member 46 and lateral side support members 48. Accordingly, the brush holder 22 is supported on the bottom surface thereof and laterally restrained on each of the opposite side surfaces as shown in FIG. 5. Vertical constraint is provided by the brush holder clip and connector, serving as a leaf spring, and wedged between the top surface of the brush holder 22 and the top edge 18 of the slot 16. The clip and connector 50 serves as a wedge, engaging the brush holder 22 by a friction fit between such brush holder and the top edge 18 of the slot 16. The base plate 30 is urged against the top of the brush holder 22.

It will be readily appreciated by those skilled in the art that the clip and connector 50 is generally V-shaped, widening from the apex of the bend 32. Accordingly, insertion of the clip and connector 50 is easily attained by first inserting the apex or bend 32 into the portion of the slot 16 exposed between the top edge 18 and the top of the brush holder 22 and driving the clip and connector 50 inwardly toward the cavity containing the commutator 14 to a sufficient distance to assure frictional locking securement of the brush holder 22. The spring biased nature of the clip and connector 50 assures such locking interengagement.

It will be readily appreciated that the clip and connector 50 may be engaged and disengaged external to the housing 12. In other words, no access to the internal cavity of the housing 12 is necessary to effectuate removal of the brush holder 22 and replacement of the same or any portion thereof. Accordingly, servicing of the brushes is greatly simplified.

With the housing of the brush holder 22 and the clip and connector 50 being electrically conductive, communication from the commutator 14 to the connector 42 is achieved. Accordingly, the element 50 serves as both a mechanical retaining clip to the brush holder 22 and an electrical interconnection therewith.

Those skilled in the art will readily recognize and appreciate that a pair of brushes will typically be employed in a system according to the invention. In standard fashion, the brushes would typically be diametrically opposed with respect to the commutator 14. According to the invention, each of the brush holders would be similar to the brush holder 22 and would be mechanically restrained and electrically connected by means of a brush holder clip and connector similar to the unit 50 described above.

It will further be readily appreciated by those skilled in the art that various modifications to the structure defined herein could be made while remaining within the spirit of the invention. While the objects of the invention have been satisfied by the structure presented hereinabove, it will be readily understood that the invention is not limited thereto or thereby. Accordingly, for an appreciation of the true scope and breadth of the invention reference should be made to the following claims.

What is claimed is:

1. Apparatus for implementation in a dynamoelectric machine, comprising:

a housing;

a commutator received within said housing;

a brush assembly passing through an opening in said housing; and a clip interposed between said brush assembly and said housing, said clip comprising a base member and a deflectable lip extending over said base member obliquely from an end thereof and positionally securing said brush assembly with respect to said housing.

2. The apparatus according to claim 1, wherein said clip is interposed between said brush assembly and said housing within said opening.

3. The apparatus according to claim 2, wherein said clip comprises a spring member.

4. The apparatus according to claim 3, wherein said clip is electrically conductive and engages an electrically conductive portion of said brush assembly.

5. The apparatus according to claim 4, wherein said conductive portion of said brush assembly comprises a brush holder, said brush holder and said clip engaging opposite edges of said opening.

6. The apparatus according to claim 4, wherein said clip further comprises a first electrical connector extending from said lip and adapted to matingly receive a second electrical connector.

7. The apparatus according to claim 4, wherein said clip comprises an integral metallic piece.

8. The apparatus according to claim 1, wherein said deflectable lip engages said housing at said opening and said base member engages said conductive portion of said brush assembly.

9. The apparatus according to claim 8, wherein said deflectable lip is configured as an electrical connector at an end thereof.

10. The apparatus according to claim 8, wherein said clip is compressed between said housing and said base member.

11. Commutating apparatus, comprising:

a housing receiving a commutator therein and having an opening passing through a wall thereof;

a brush assembly passing through said opening; and a spring biasing clip received within said opening and compressively interposed between said wall and said brush assembly, said clip having a base member engaging said brush assembly along the length of said base member, and a deflectable lip engaging said wall at said opening said deflectable lip acutely extending from and over one of said base.

12. The commutating apparatus according to claim 11, wherein said clip is electrically conductive and engages an electrically conductive portion of said brush assembly.

13. The commutating apparatus according to claim 12, wherein said clip is generally V-shaped.

14. The commutating apparatus according to claim 13, wherein said clip has a first electrical connector extending from an end thereof and adapted for matingly engaging a second electrical connector.

15. The commutating apparatus according to claim 11, wherein said clip engages said wall and said brush assembly from a side of said wall opposite said commutator.

* * * * *